(12) United States Patent
Patangay

(10) Patent No.: US 11,036,984 B1
(45) Date of Patent: Jun. 15, 2021

(54) INTERACTIVE INSTRUCTIONS

(71) Applicant: Facebook, Inc., Menlo Park, CA (US)

(72) Inventor: Girish Patangay, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 272 days.

(21) Appl. No.: 16/153,655

(22) Filed: Oct. 5, 2018

Related U.S. Application Data

(60) Provisional application No. 62/682,818, filed on Jun. 8, 2018.

(51) Int. Cl.
| | | |
|---|---|---|
| *G06K 9/00* | (2006.01) | |
| *G06K 7/14* | (2006.01) | |
| *G09B 19/00* | (2006.01) | |
| *G06K 7/10* | (2006.01) | |
| *G06K 9/32* | (2006.01) | |

(52) U.S. Cl.
CPC ..... *G06K 9/00671* (2013.01); *G06K 7/10722* (2013.01); *G06K 7/1413* (2013.01); *G06K 7/1417* (2013.01); *G06K 9/325* (2013.01); *G09B 19/003* (2013.01)

(58) Field of Classification Search
CPC ............. G06K 9/00671; G06K 7/1413; G06K 7/1417; G06K 9/325; G06K 7/10722; G09B 19/003
See application file for complete search history.

(56) References Cited

U.S. PATENT DOCUMENTS

| | | | |
|---|---|---|---|
| 10,692,491 B2 * | 6/2020 | Sisodia | ............... G10L 15/18 |
| 2015/0101066 A1 * | 4/2015 | Fram | ................. G06F 21/44 |
| | | | 726/28 |
| 2016/0104386 A1 * | 4/2016 | Kruglick | ............ G09B 5/04 |
| | | | 434/309 |
| 2016/0227294 A1 * | 8/2016 | Liekens | .......... H04N 21/2353 |
| 2017/0345079 A1 * | 11/2017 | Rangan | .......... G06Q 30/0633 |
| 2018/0165978 A1 * | 6/2018 | Wood | ................ G06T 19/006 |
| 2020/0142388 A1 * | 5/2020 | Maggiore | ............ H04W 4/33 |

* cited by examiner

*Primary Examiner* — Wesley J Tucker
(74) *Attorney, Agent, or Firm* — Baker Botts L.L.P.

(57) ABSTRACT

In one embodiment, a technique includes detecting an identifier associated with a product. The technique further includes accessing a content object associated with the identifier on a third-party system. In the technique, the content object includes a set of instructions. The technique also includes detecting a trigger. The technique further includes selecting a step of the content object and outputting the selected step.

20 Claims, 6 Drawing Sheets

INTERACTIVE INSTRUCTIONS

PRIORITY

This application claims the benefit, under 35 U.S.C. § 119(e), of U.S. Provisional Patent Application No. 62/682,818, filed 8 Jun. 2018, which is incorporated herein by reference.

TECHNICAL FIELD

This disclosure generally relates to providing interactive instructions.

BACKGROUND

Task manuals provide a systematic way to guide users in completing complex tasks. However, understanding task manuals can be difficult, time-consuming, and boring. Accordingly, techniques for making task manuals more engaging for users would be useful.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

This disclosure relates to a technique for providing interactive instructions to users. In particular, the disclosure includes one or more third-party systems that each stores one or more content objects. Content objects may describe a set of instruction to complete a task (e.g., assembling a product). In addition, the disclosure includes a client system configured to monitor, subject to privacy controls expressly set by an owner of the client system, a system environment. When an object enters the system environment, the client system images the object to capture object identifiers (e.g., QR codes, bar codes, numbers, etc.). The client system utilizes the identifiers to pull information from a database maintained by a third-party system that stores relevant content objects. The client system downloads one or more relevant content objects and sequentially displays instruction steps from the content object to the user to assist the user in completing the task. The client system may access user information in accordance with privacy settings expressly specified by the client system's owner and each user that comes within the visual field of the device. For example, the client system owner may specify that under no circumstances may the device access information about anyone that is stored by the social-networking system. In this scenario, the client system would not communicate with remote servers with regard to any type of user information. As another example, the client system owner may specify that the device may access information stored by the social-networking system to enhance the user's experience (as will be discussed below). In this scenario, the client system may communicate with the social-networking system with regard to the client system owner's social-networking data, but the client system will continue to check for permission to access other user's social-networking data. For example, if the client system owner has opted into social-networking data access, but the client system owner's friend has not opted in, the client system will not access the friend's social-networking data.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
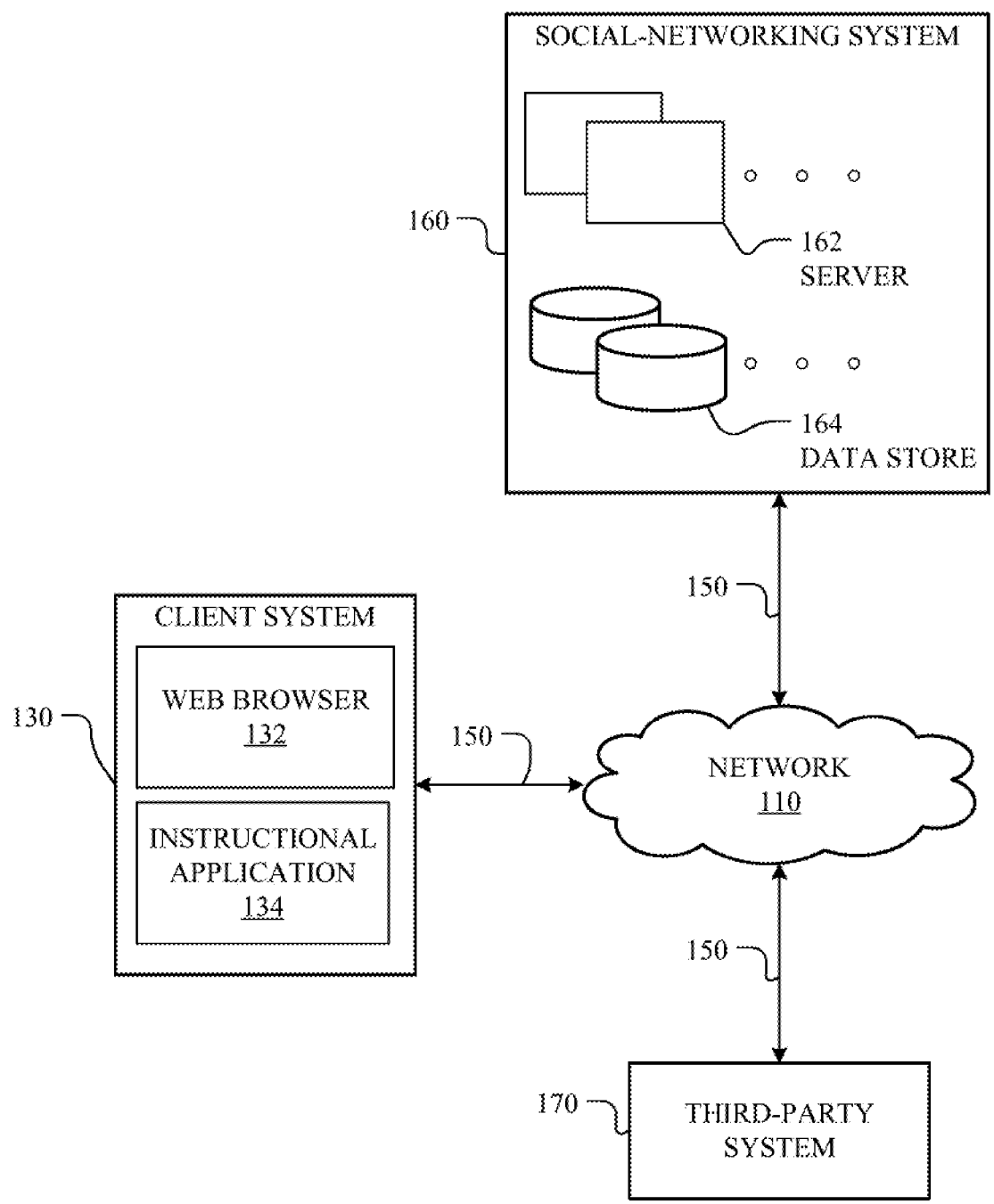
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In various embodiments, the client system 130 may include one or more input/output (I/O) devices. The client system 130 may receive input via one or more of the input devices. In addition, the client system may output information via one or more of the output devices. For example, and not by way of limitation, the client system 130 may one or more input devices, including visual input devices (e.g., cameras, barcode readers, QR code readers, etc.), audio input devices (e.g., microphones), detectors and sensors (e.g., touch, force, gesture, contact, and proximity-sensitive detectors.), and so forth. In addition, the client system 130 may include one or more output devices, such as visual output devices (e.g., displays), audio output devices (e.g., speakers), and so forth.

In various embodiments, the client system may also store an instructional application 134. The instructional application 134 may configure the client system 130 to perform one or more operations including, for example and not by way of limitation, monitoring, subject to privacy control settings of the client system owner, a system environment, obtaining, subject to the above-mentioned privacy control settings, object data related to one or more objects and/or image data related to one or more users in a system environment, analyzing the object data to identify a product and the image data to identify a user if the client system owner has expressly allowed that functionality and that user has opted in to being identified by the client system, accessing a third-party system 170 corresponding to the product and obtaining, if the user has expressly opted in to sharing her social-networking data, user preferences associated with the user from the social-networking system 160, selecting one or more content objects from the third-party system 170 to display to a user, and based on user feedback, displaying the content objects to the user, as described in further detail below.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110.

As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In various embodiment, the social-networking system 160 may store one or more user nodes. The user nodes may include user profiles that indicate user preferences. For example, a first user profile could indicate that a first user prefers to view text-based content objects, while a second user profile could indicate that a second user prefers to listen to audio-based content objects.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

Additionally, or alternatively, content object may include a set of instructions for completing a task (e.g., cooking a meal, tying a knot, assembling a chair, etc.). Content objects may include one or more data types, such as, for example and not by way of limitation, audio, text, video, and image data. In particular, one or more content objects may relate to one or more products (e.g., ready-to-assemble furniture, unassembled product kits, packaged meal ingredients, etc.). Additionally, or alternatively, content objects may include task-based instructions, such as, for example and not by way of limitation, steps to tie a knot, steps to tie a necktie, steps to complete a French braid, steps to complete a task, etc.). Content objects associated with a product may be stored in a third-party system 170 that corresponds to the product. In addition, the third-party system 170 may associate a product and/or task identifier with a content object. For example, a ready-to-assemble furniture item may have a first identifier that is associated with a video-based content object and a text-based content object. The video-based content object may include a step-by-step animation of the furniture item being assembled, while the text-based content object may display a set of action items that the user should perform to assemble the furniture item. Additionally, or alternatively, one or more different content objects may be associated with a task and/or a product. Accordingly, the third-party system 170 may store multiple sets of instructions for each task and/or product. For example, the third-party system 170 may store content objects corresponding to a simplified instruction set, a detailed instruction set, one or more variant designs, etc.

In various embodiments, a content object may also be indexed by a category. For example, a first category identifier may correspond to all product that may be classified as furniture items. Accordingly, a content object corresponding to a ready-to-assemble chair and a second content object corresponding to a ready-to-assemble desk may both be indexed by the first product category identifier. In various embodiments, if a content object associated with a product identifier is not available, then the content object may be substituted with another content object if both content objects are associated with the same category. For example, a first category may correspond to tying a knot. A first identifier of the first category may correspond to tying a Windsor knot and a second identifier of the first category may correspond to tying a Pratt knot. If a content object associated with tying a Windsor knot is not available, then a request for tying the Windsor knot may be redirected to a content object associated with tying a Pratt knot, because both the product identifier associated with tying a Windsor knot and the product identifier associated with tying a Pratt knot are associated with the same category identifier.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party systems 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. If the user has opted in to receiving advertisement-pricing modules, and has enabled location enabled services, advertisement-pricing modules may combine social information, the current time, location information, or other suitable information to provide relevant advertisements, in the form of notifications, to a user.

In various embodiments, the client system 130 may include an instructional application 134. The instructional application 134 may configure the client system 130 to execute one or more steps of the disclosed technique. For example, the instructional application 134 may configure the client system 130, subject to the privacy control settings of the client system owner, to monitor a system environment. As an example and not by way of limitation, the client system owner may specify that she does not want the client system to monitor any environment surrounding the client system. In this case, the instructional application 134 would not be able to configure the client system 130 to monitor the system environment. If, on the other hand, the client system owner has opted in to allowing the client system 130 to monitor the environment, the following discussion may apply. The system environment may include, for example and not by way of limitation, people and/or objects located in a spatial area, such as a room, an enclosure, an open space, an area, a perimeter, etc. In particular, the instructional application 134 may configure the client system 130 to capture data associated with one or more objects and/or people, so long as each person for which data is being captured has opted in to sharing data, that are located within the system environment and/or that are entering the system environment. For example, the instructional application 134 may configure an I/O device of the client system 130 to capture, subject to privacy control settings of the client system owner and any other people in the environment, image data of objects entering the system environment.

In various embodiments, the instructional application 134 may analyze the data to detect, subject to privacy control settings of the client system owner and any other people in the environment, one or more objects and/or people within a system environment. For example, the instructional application 134 may obtain, subject to privacy control settings of the client system owner and any other people in the environment, image data of a system environment and further compute one or more regions of interest that each include at least one object or face. The instructional application 134 may further perform, subject to privacy control settings of the client system owner and any other people in the environment, object recognition and/or facial recognition on each region of interest to identify, subject to privacy control settings of the client system owner and any other people in the environment, one or more objects and/or one or more people in a system environment.

With respect to object recognition, the instructional application 134 may implement one or more object recognition techniques (e.g., feature extraction) to identify, subject to privacy control settings of the client system owner, one or more objects in a system environment. Furthermore, the instruction application 134 may analyze, subject to privacy control settings of the client system owner and any other people in the environment, image data to extract one or more identifiers located on the object. An identifier may include, for example and not by way of limitation, a barcode, a quick-response (QR) code, a product name, a product description, a product symbol, a product identifier, etc. Additionally, or alternatively, the instructional application 134 may analyze, subject to privacy control settings of the client system owner and any other people in the environment, the data to associate the object with one or more categories. A category may include, for example, and not by way of limitation, a brand, a product type, a product usage, etc. For example, the instructional application 134 may identify a brand logo located on an object (e.g., a box) and further associate the object with a brand corresponding to the brand logo.

With respect to recognizing individuals in a system environment, the instructional application 134 may implement, subject to privacy control settings of the client system owner and any other people in the environment, one or more facial recognition tools (e.g., convolutional neural networks) to identify an individual in the system environment. Furthermore, the instructional application 134 may optionally access, subject to privacy control settings of the client system owner and any other people in the environment, the social-networking system 160 to determine if the detected individual in the system environment has opted in to allowing themselves to be identified by a client system 130 and if the individual corresponds to a user of a social graph stored in the social-networking system 160 (e.g., by determining if an image of an individual matches a profile image of a user of the social graph). Accordingly, if a match is identified, then the instructional application 134 may obtain one or more user preferences from the social graph, subject to user privacy settings. In particular, the instructional application 134 may determine from the user preferences a type of content object that the user prefers to consume. Content object types include for example and not by way of limitation, video content objects, textual content objects, audio content objects, and image content objects. For example, the instructional application 134 may identify from the stored user preferences that a user frequently views video content, instead of reading text transcripts. Accordingly, the instructional application 134 may determine that the user prefers to view video content, rather than read textual content. Additionally, or alternatively, the instructional application 134 may determine from analyzing user preferences that a user reads textual content more often than listening to audio content. Accordingly, the instructional application 134 may determine that the user prefers textual content more than audio content.

In various embodiments, the instructional application 134 may determine, subject to privacy control settings of the client system owner and the individual, whether an individual in a system environment is associated with an object. For example, the instructional application 134 may determine a proximity between an individual and an object. If the distance is below a threshold distance, then the instructional application 134 may determine that the individual is associated with the object. Additionally, or alternatively, the instructional application 134 may determine that an individual is associated with an object if the individual is interacting with the object. For example, the instructional application 134 may, subject to privacy control settings of the client system owner and any other people in the environment, analyze input data from the I/O devices to determine if the user is interacting with the object (e.g., holding the object, touching the object, opening the object, looking at the object, etc.). Furthermore, the instruction application 134 may receive from a user a specific object (e.g., a product) and/or a task for which one or more content objects (e.g., instruction sets) should be sourced from the third-party system 170. The content objects may simply be retrieved from the third-party system and no user information may be shared with the third-party system, In various embodiments, the instructional application 134 accesses a third-party system 170 to obtain one or more content objects corresponding to an identified object. In particular, the instructional application 134 identifies a third-party system 170 that corresponds to an identifier and/or a category associated with the identified object. The third-party system 170 may be a merchant that sells the identified object, a website with instructional content associated with the product, and so forth. In various embodiments, the third-party system 170 may store one or more content objects associated with each product identifier and/or category. Accordingly, the instructional application 134 may select one or more content objects to provide to the user. In particular, the instructional application 134 may select one or more content objects from the third-party system 170 based on user preference and/or user history. For example, if the instructional application 134 determines that the user prefers to watch video content items and the third-party system 170 stores two or more video content object corresponding to different instruction sets that are associated with the identifier and/or the category of the identified object, then the instructional application 134 may select a video content object based on user preferences and/or user history. For example, the instructional application 134 may select a video content object corresponding to a simplified instruction set for a user who is new to assembling products and/or completing the task, and/or select a video content object corresponding to an advanced instruction set for a user experience in assembly products and/or completing the task.

In various embodiments, the instruction application 134 may enable users to directly enter user preferences into the client system 130. For example, the instruction application 134 may output a set of content objects corresponding to an identifier and/or category and request the user to select a content object. Based on the user input, the instructional application 134 may select a content object to download and/or stream to the client system 130. Accordingly, the instruction application 134 may receive user input with respect to which of a set of content objects select for a product or task (e.g., selecting one of a set of instruction sets), a data type of the one or more content objects to select (e.g., text, image, audio, video, etc.), and so forth.

In various embodiments, the instructional application 134 may further download and/or stream the selected content objects onto the client system 130. In addition, the instruction application 134 may configure the client system 130 to output the selected content objects to the user. For example, the instructional application 134 may configure the client system 130 to implement one or more I/O devices (e.g., a display) to output a textual content object to a user. Additionally, or alternatively, the instructional application 134 may download and/or stream an audio content object onto the client system 130. In particular, the instructional application 134 may configure the client system 130 to implement one or more I/O devices (e.g., a speaker) to output the audio content object to a user.

In various embodiments, the instructional application 134 delivers the selected content objects to the user in a step-wise manner. Accordingly, the instructional application 134 may select a first step to output to the user. After the user completes the first step, the instruction application 134 may select a second step to display to the user. In particular, the instruction application 134 may monitor the system environment for one or more triggers. Trigger may include for example and not by way of limitation, gesture-based triggers, audio triggers, voice triggers, time-based triggers, contact and proximity-based triggers, context-based triggers, and so forth. For example, gesture-based triggers may include hand motions, facial expressions, gaze direction, gaze intensity, and gaze shifts, body position and movements, and so forth. Audio triggers may include environmental sounds, such as footsteps, hand claps, tapping sounds, clicks, humming, sounds generated by a user moving, and so forth. Voice triggers may include vocalized keywords, pauses, inflections, rate of speech, pitch effects, special sounds, and so forth. Time-based triggers may include the elapse of one or more time intervals, a scheduled time, a time-of-day, an event, and so forth. Contact triggers may include taps, swipes, double taps, tap-and-hold, knuckle taps, and so forth. In addition, context-based triggers may include a type of object entering the system environment (e.g., a ready-to-assemble furniture item), an object with an identifier and/or category entering the system environment, and so forth.

After detecting a trigger, the instructional application 134 may identify a step of the content object that is associated with the trigger and further configure the client system 130 to output the step to the user. For example, subject to privacy control settings of the client system owner and any relevant user in the environment, a first trigger may be a context-based trigger (e.g., a user carrying a box with QR code into the system environment). Accordingly, the instructional application 134 may identify a category (e.g., website decoded form the QR code) and/or an identifier (e.g., a product code associated with the QR code). The instructional application 134 may further access the third-party system 170 corresponding to the website and identify one or more content objects associated with the product code. In addition, the instructional application 134 may determine, subject to privacy control settings of the client system owner and any relevant user in the environment, that an individual carrying the box is a user associated with the social-networking system 160. A user is a relevant user if the client system attempts to retrieve information about that user from a remote server. Accordingly, the instructional application 134 may access user preferences associated with the user (e.g., in a user profile associated with the user) and select one or more content objects to output to the user based on user preferences, as described above.

After detecting a second trigger, the instructional application 134 may output a first step in the content object to the user. For example, the second trigger may be any of the above-referenced triggers such as a gesture trigger. In particular, after the user has completed a step, the user may make a gesture. The instructional application 134 may detect the gesture and further configure the client system 130 to output a next step to the user. Additionally, or alternatively, each step of the content object may be associated with a trigger. Accordingly, when the instructional application 134 detects a trigger, the instructional application 134 may associate the detected trigger with a particular step in the content object, select a next step from the content object to display to the user, and further configure the client system 130 to output the next step to the user.

In various embodiments, the instructional application 134 may perform a validation check. In particular, the instructional application 134 may check whether all of the requite items to complete a product and/or task are assembled (e.g., ingredients of a ready-to-cook meal, parts of a ready-to-assemble furniture set, etc.) For example, each content object may include a list of items for completing a product and/or task. The instruction application 134 may instruct the user to lay out all of the items for a product and/or task. The instructional application 134 may further configure the client device 130 to capture one or more images of the items. The instructional application 134 may analyze the captured images and compare each item in an image to the set of items specified in the content object. The instructional application 134 may notify a user if one or more items are missing and instruct the user to acquire the missing item and/or return the product to the merchant.

In various embodiments, the instructional application 134 may, subject to privacy control settings of the client system owner and any relevant user in the environment, monitor the progress of the user as the user completes a step. For example, the instructional application 134 may, subject to privacy control settings of the client system owner and any relevant user in the environment, monitor the movements of the user as the user completes the step, may identify is a user makes an error while completing the step, may, subject to privacy control settings of the client system owner and any relevant user in the environment, identify if the user pauses and/or moves away while completing a step, may measure an amount of time that the user takes to complete a step, and so forth. For example, if the instructional application 134 determines, subject to privacy control settings of the client system owner and any relevant user in the environment, that a user makes a mistake while completing a step, the instructional application 134 may indicate the error to the user (etc., displaying a warning sign on a display, output a warning tone via speaker, etc.) Additionally, or alternatively, the instructional application 134 may re-output the step and/or dynamically provide instructions that indicate a corrective action that the user may take to mitigate the error (e.g., displaying an image of a part that the user should select, outputting instructions to guide the user in finding the correct part, etc.) Additionally, or alternatively, the instructional application 134 may match the deviant step to an instruction set corresponding to one or more different content objects associated with an alternative design. Accordingly, the instructional application 134 may enable the user to select whether to correct the deviant step or to complete the alternative design.

In various embodiments, the instructional application 134 may dynamically select a next step based on various factors, including for example and not by way of limitation, one or more steps that are completed, one or more steps that are not completed, a user's progress in completing one or more steps (e.g., duration, a number of times that a user paused while completing the set, etc.), and so forth. For example, if instructional application 134 determines that a user may have skipped a step and the instructional application 134 determines that a current step is complete, the instructional application 134 may selected the skipped step as the next step for output to the user.

In addition, the instructional application 134 may monitor a user's progress in completing a step. For instance, the instructional application 134 may perform a verification step to determine if a step is completed correctly. For instance, based on a user request, the instructional application 134 may execute one or more object detection algorithms to determine a position and/or orientation of an object. In addition, the instructional application 134 may further compare the position and orientation of the object with image data received from the third-party systems 170 that indicates a correct position and/or orientation of the object. The instructional application 134 may determine based on the comparison, whether the object is positioned and/or oriented correctly and further generate a notification for the user that indicates whether the object is positioned and/or oriented correctly. In addition, if the orientation of the object is incorrect, the instructional application 134 may provide the user with steps to re-position and/or re-orient the object. In further embodiments, the instructional application 134 may perform the verification step automatically, without user prompting.

In addition, the instructional application 134 may also analyze user preferences to determine one or more parameters for outputting content objects to the user including, for example and not by way of limitation, a size of text or images, a rate of audio or video playback, a volume of audio or video playback, and so forth.

Furthermore, the instructional application 134 may implement branded effects (e.g., an animation appended to a company logo) based on one or more triggers. For example, after the instructional application 134 determines that a step is complete, the instructional application 134 may display an advertisement and/or a special effect that corresponds to the task, the product, and/or a step of the content object being completed. In particular, the advertisement may relate to a part being used (e.g., advertising a company that sells the part), a technique being completed (e.g., advertising a company that offers a course about the technique), a related product, and so forth.

In various embodiments, based on a default privacy setting and/or a privacy setting of a user, the instructional application 134 may restrict information displayed by the client device 130. In some embodiments, the default privacy setting may be generated based on an age of the user. For example, if the user is a minor, then a strict privacy setting may be implemented. In some embodiment, the view area of an image capture device may be limited based on the default privacy setting and/or the privacy setting. For example, the image capture device may restrict the view area of an image capture device if the default privacy setting and/or the user privacy setting is strict.

In addition, the instructional application 134 may enable a moderator capability. Accordingly, the instructional application 134 may route information displayed on the client device 130 by a moderator interface. In particular, the instructional application 134 may output visual and/or audio content from a third-party system 170 to the moderator interface displayed on a second client device, before transmitting the content to the user via client device 130. In various embodiments, the instructional application 134 may implement a time delay before transmitting content to the client system 130. During the time delay, the instructional application 134 may output the content on the moderator interface and receive feedback on the content. Based on the feedback, the instructional application 134 may edit the content responsive to user input via one or more moderator controls. For example, the moderator interface may include one or more controls that enable a user of the moderator interface select content for editing (e.g., remove a segment of audio and/or visual content). Accordingly, when displaying the content on the client device 130, the instructional application 134 may display the edited content (e.g., by displaying one or more portions of the original content.) Accordingly, the moderator interface may enable filtering of content displayed on the client system 130. In further embodiments, a moderator bot may be implemented that automatically filters out offensive content from the third-party system 170.

Moreover, a user may provide feedback and/or change the content displayed on the client device 130. For example, responsive to a gesture, the instructional application 134 may select a different content object for the third-party system 170. Additionally, or alternatively, the instructional application 134 may provide a listing of available content objects on the third-party system 170 and allow the user to select a content object for display on the client device 130.

In further embodiments, the instructional application 134 may be networked with one or more other third-party systems 170, subject to user privacy settings, such as, for example, and not by way of limitation, internet-of-things devices, timers, ovens, lighting systems, and so forth. Accordingly, the instructional application 134 may turn on and off various third-party systems 170 that corresponds to a step that the user is completing (e.g., pre-heating an oven as a user prepares a meal, turning on a timer when the user places food into the oven, etc.). as the user proceeds through one or more steps. In addition, the instructional application 134 may display one or more branded advertisements that correspond to each third-party system 170 that corresponds to a step that the user is completing, has completed, is about to complete, etc.

Figure 2:
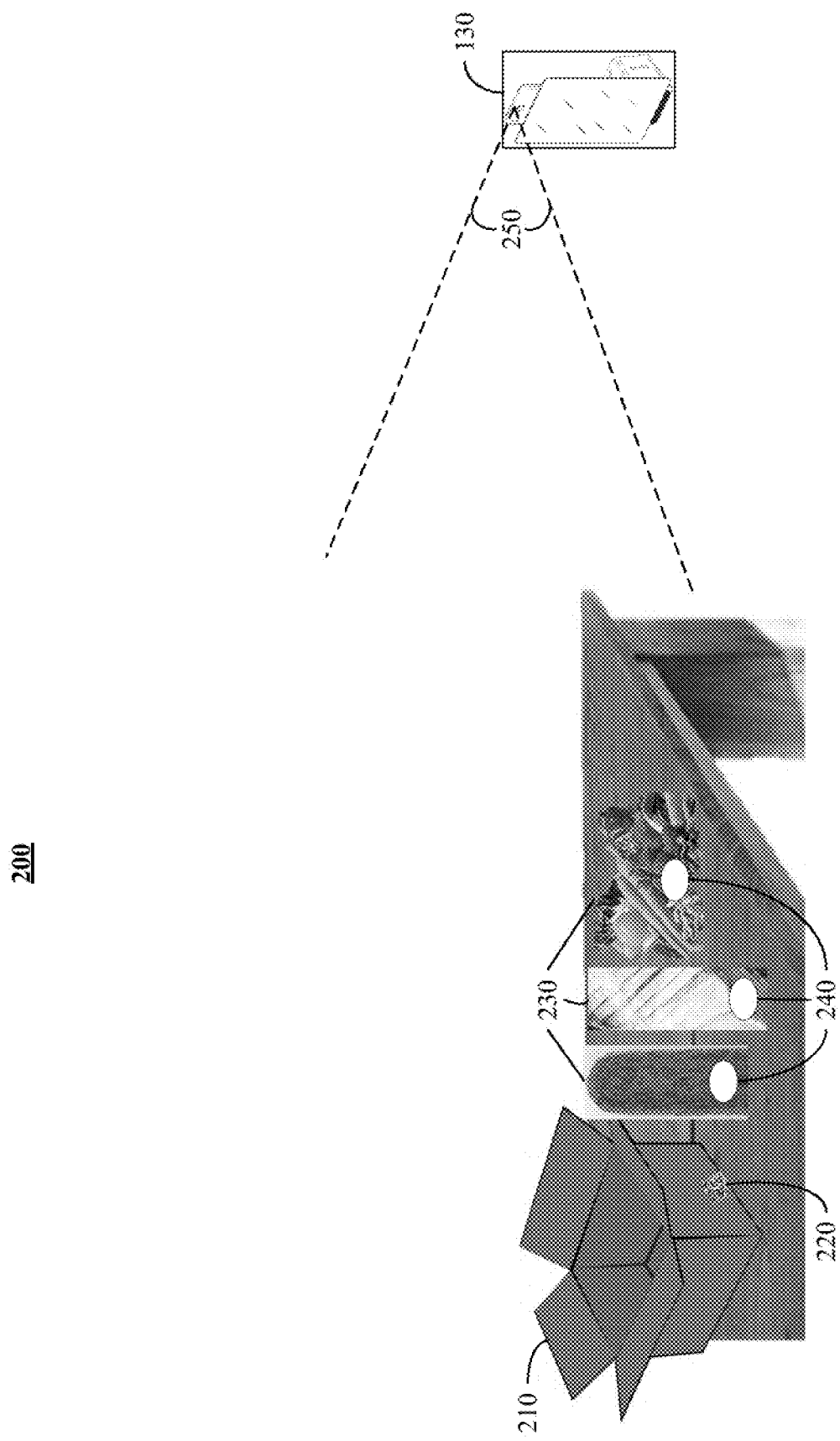
FIG. 2 illustrates an example system environment for provide interactive instructions, according to various embodiments.

FIG. 2 illustrates an example system environment 200 for provide interactive instructions, according to various embodiments. In particular, system environment 200 includes client system 130 with field-of-view 250, box 210, identifier 220, items 230, and labels 240. In various embodiments, the instructional application 134 configures the client system 130 to detect, subject to privacy control settings of the client system owner and any relevant user in the environment, an object (e.g., box 210) in system environment 200. For example, client system 130 may generate, subject to privacy control settings of the client system owner and any relevant user in the environment, image data that captures box 210. The instructional application 134 may analyze the image data to isolate a region of interest including identifier 220. The instructional application 134 may further identify a universal resource locator (URL) or token associated with the identifier 220 and access a third-party system 170 associated with the identifier 220 (e.g., a merchant website corresponding to URL). The client system 130 may identify one or more content objects associated with the identifier 220, such as one or more video instruction guides. The client system 130 may display the content objects for display to the user using a display screen and one or more speakers.

In various embodiments, the instructional application 134 may perform a validation check. In particular, the instructional application 134 may configure the client system 130 to instruct the user to place each item 230 in the box on a table. Accordingly, the instructional application 134 may capture, subject to privacy control settings of the client system owner and any relevant user in the environment, image data of each of the items. In particular, the instructional application 134 may analyze, subject to privacy control settings of the client system owner and any relevant user in the environment, the image to capture one or more features of the items 230, such as, for example, labels 240. The instructional application 134 may implement one or more decodes (e.g., a natural-language understanding unit) to analyze the labels to identify each item 230. The instructional application 134 may generate a list of items 230 and compare the list of items 230 to a list included in the content object. If one or more items are not detected, then the instructional application 134 may configure the client system 130 to instruct the user to check the box 210 to ensure that the one or more items that were not detected are included in the box 210. If the user places the missing objects in the field-of-view 250 of the client device, then the instruction application 134 may perform the validation check again. Additionally, or alternatively, the instructional application 134 may configure the client device 130 to allow the user into indicate if the objects are not present in the box 210. For example, the instructional application 134 may configure the client device 130 to detect a trigger (e.g., a change in facial expression or a bodily gesture) that indicates that the missing items are not in the box. If the trigger is detected, then the instructional application 134 may generate output that requests the user to verify if the objects are missing (e.g., via speakers). If the user confirms that the objects are missing, the instructional application 134 may generate a notification on the third-party system 170 that a shipment was missing one or more items, and/or instruct the user to return the product (e.g., box 210) and/or obtain the missing items.

Figure 3:
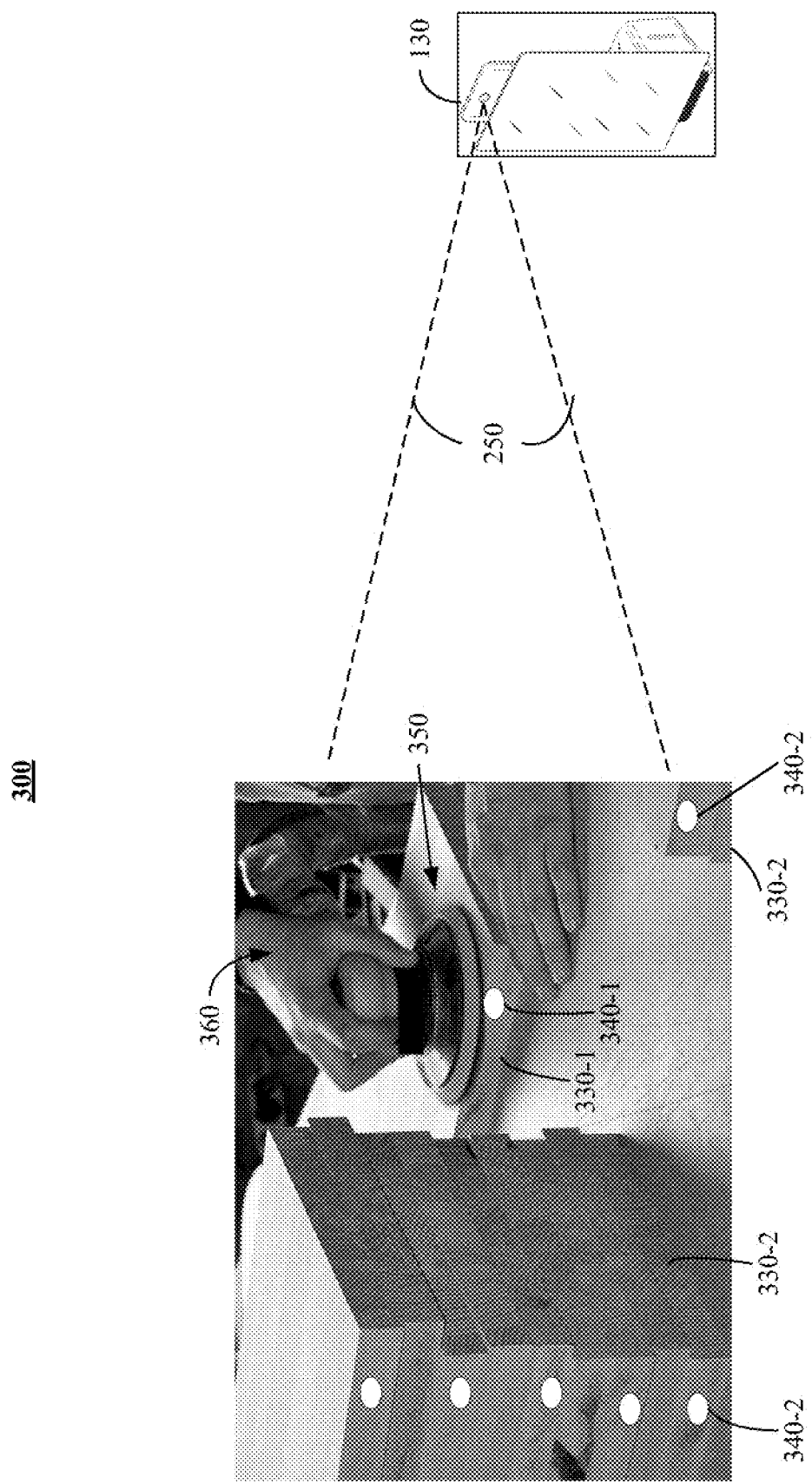
FIG. 3 illustrates an example system environment for monitoring user responses to interactive instructions, according to various embodiments.

FIG. 3 illustrates an example system environment 300 for monitoring user responses to interactive instructions, according to various embodiments. In particular, system environment 300 includes client system 130 with field-of-view 250, parts 330-1 and 330-2, labels 340-1 and 340-2, tool 350, and user 360. In various embodiments, instructional application 134 may select a content object from a third-party system 170 for output to a user. In particular, the instruction application 134 may stream a content object from a third-party system 170 to a client system 130 for output to a user 360. Additionally, or alternatively, the instructional application 134 may download the content object from the third-party system 170 to the client system 130. The instruction application 134 may further select one or more steps for output to the user 360 and configure the client system 130 to output the selected content object steps to the user 360.

The instructional application 134 may identify, subject to privacy control settings of the client system owner and any relevant user in the environment, the parts 330-1 and 330-2 by implementing one or more object recognition techniques (e.g., feature extraction of the parts 330-1 and 330-2, natural-language understanding of the labels 340-1 and 340-2, etc.). Based on identifying the parts 330-1 and 330-2 and the labels 340-1 and 340-2, the instructional application 134 may determine an identifier and a category for the parts 330-1 and 330-2. The category may describe a brand or a general task (e.g., HomeDepot®, woodworking, etc.) and the identifier may describe a specific product or a specific task (e.g., product #3452 or a designer table, etc.).

In addition, the instructional application 134 analyze, subject to privacy control settings of the client system owner and any relevant user in the environment, image data to identify the user 360 as a user of the social-networking system 160. Furthermore, subject to privacy settings, the instructional application 134 may access, subject to privacy control settings of the user and client system owner, a user profile associated with user 360 to identify user information (e.g., user preferences and/or user history). In particular, the instructional application 134 may implement the user information to select a content object from the third-party application 170 to output to the user. For example, the third-party system 170 may store multiple content items for each product. In particular, the third-party system 170 may store content objects corresponding to a simplified instruction set, a detailed instruction set, one or more variant designs, etc. Additionally, or alternatively, the third-party system 170 may store different data type versions of each content object, such as video, textual, image, and/or audio versions. In various embodiments, the instructional application 134 may select one or more content objects to present to the user 360. In various embodiments, a user 360 may select one or more content objects from the set of content objects presented by the instructional application 134. Accordingly, the instructional application 134 may download and/or stream the selected content object to the client system 130.

In various embodiments, the instructional application 134 may select one or more steps of the content object for output to the user 360. For example, the instructional application 134 may select a step that instructs the user 360 to use tool 350 to sand part 330-1. Accordingly, the instructional application may monitor the user as he or she applies tool 350 onto part 330-1. In various embodiments, the instruction application 134 may configure the client system 130 to output additional instructions to the user. For example, the instructional application 134 may determine that the user has not completed the entire step (e.g., that the user has not sanded a section of part 330-1). Accordingly, the instructional application 134 may generate one or more additional instruction steps to guide the user in completing the entire step. For example, the instructional application may determine that the user should move the tool 350 to the left to sand the identified section of part 330-1. Accordingly, the instructional application 134 may generate additional instruction steps that instruct the user to move the tool to the left. Furthermore, the instructional application 134 may configure the client system 130 to output the additional instructions to the user. In various embodiments, the instructional application 134 may continue to monitor the progress of user 360 in completing the entire step and dynamically provide additional instructions as the step is completed.

In various embodiments, the instructional application 134 may identify that a user 360 has completed a step. For example, the instructional application 134 may determine that the user 360 has lifted the tool 350 and/or that the part 330-1 is fully sanded. Additionally, or alternatively, a user 360 may verbally indicate that the step is complete. Accordingly, the instructional application 134 may identify a next step and configure the client system 130 to output the next step to the user 360.

In further embodiments, the instructional application 134 may output branded advertisements on the client system 130. For example, as the user 360 completes a step, the instructional application 134 may display an advertisement for a company that sells a product that may be related to the step (e.g., a product that may be useful in completing the step, a product that is similar to a part or tool used in completing the step, etc.).

Figure 4:
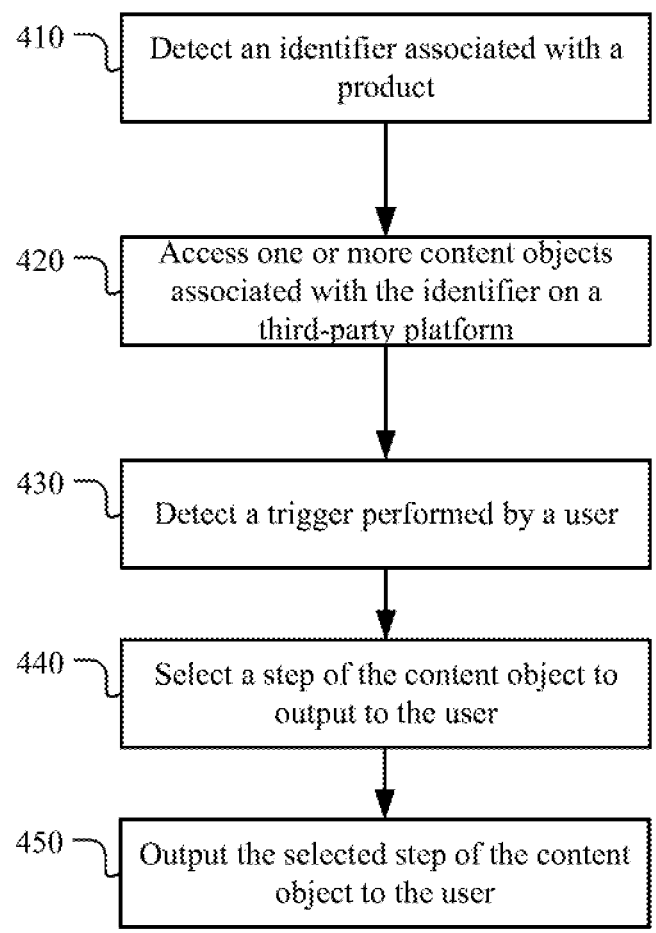
FIG. 4 illustrates an example method for providing interactive instructions.

FIG. 4 illustrates an example method 400 for providing interactive instructions, according to various embodiments. The method may begin at step 410, where the instructional application 134 detects an identifier 220 associated with a product. In various embodiments, the product identifier may be carried into a system environment (e.g., a room) by a user. The instructional application 134 may configure a client system 130 to, subject to privacy control settings of the client system owner and any relevant user in the environment, monitor a system environment and to generate image data of objects and/or people entering the system environment.

At step 420, the instructional application 134 accesses one or more content items on a third-party system 170 that corresponds to the identifier 220. For example, the instructional application 134 may decode the identifier 220 to obtain a URL. The instructional application 134 may utilize the URL to access the third-party system 170 and one or more content objects associated with the identifier 220. In addition, the instruction application 134 may select one or more content objects to download and/or stream to the client system 130. For example, the instructional application 134 may provide the user with a selection of content items from which to choose and/or may analyze user preference data to identify a candidate content object that the user may prefer to receive.

At step 430, the instructional application 134 may detect a trigger performed by a user. For example, the instructional application 134 may detect that a user performed a gesture indicting that the instructional application 134 should output step of the content object. Additionally, or alternatively, the instructional application 134 may determine that the user has open a box and has place one or more items from the box on the table. In particular, the instruction application 134 may perform a validation check. In various embodiments, if the all of the items of the product are present, then the instruction application 134 may output the first step. Additionally, or alternatively, if one or more items are missing, then the instructional application 134 may instruct the user to check inside the box to make sure that all of the items are removed and/or instruct the user to return the product to an associated merchant.

At step 440, the instructional application 134 may select a step of the content object to output to the user. For example, the instructional application 134 may select a next step that linearly follows a present step. Alternatively, the instructional application 134 may select a next step based on various factors, such as an amount of time that a user took in completing the last step, one or more steps that are completed, one or more steps that are not completed, etc. For example, if a user has skipped a step, then the instructional application 134 may select the skipped step as the next step.

At step 450, the instructional application 134 may output the selected step of the content object to the user. For example, the instructional application 134 may configure the client system 130 to output a step of a video content object via a display and one or more speakers. In some embodiments, the instructional application 134 may generate and configure the client system 130 to output additional instructions to guide the user in completing the selected step.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for dynamic location update delivery including the particular steps of the method of FIG. 4, this disclosure contemplates any suitable method for dynamic location update delivery including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
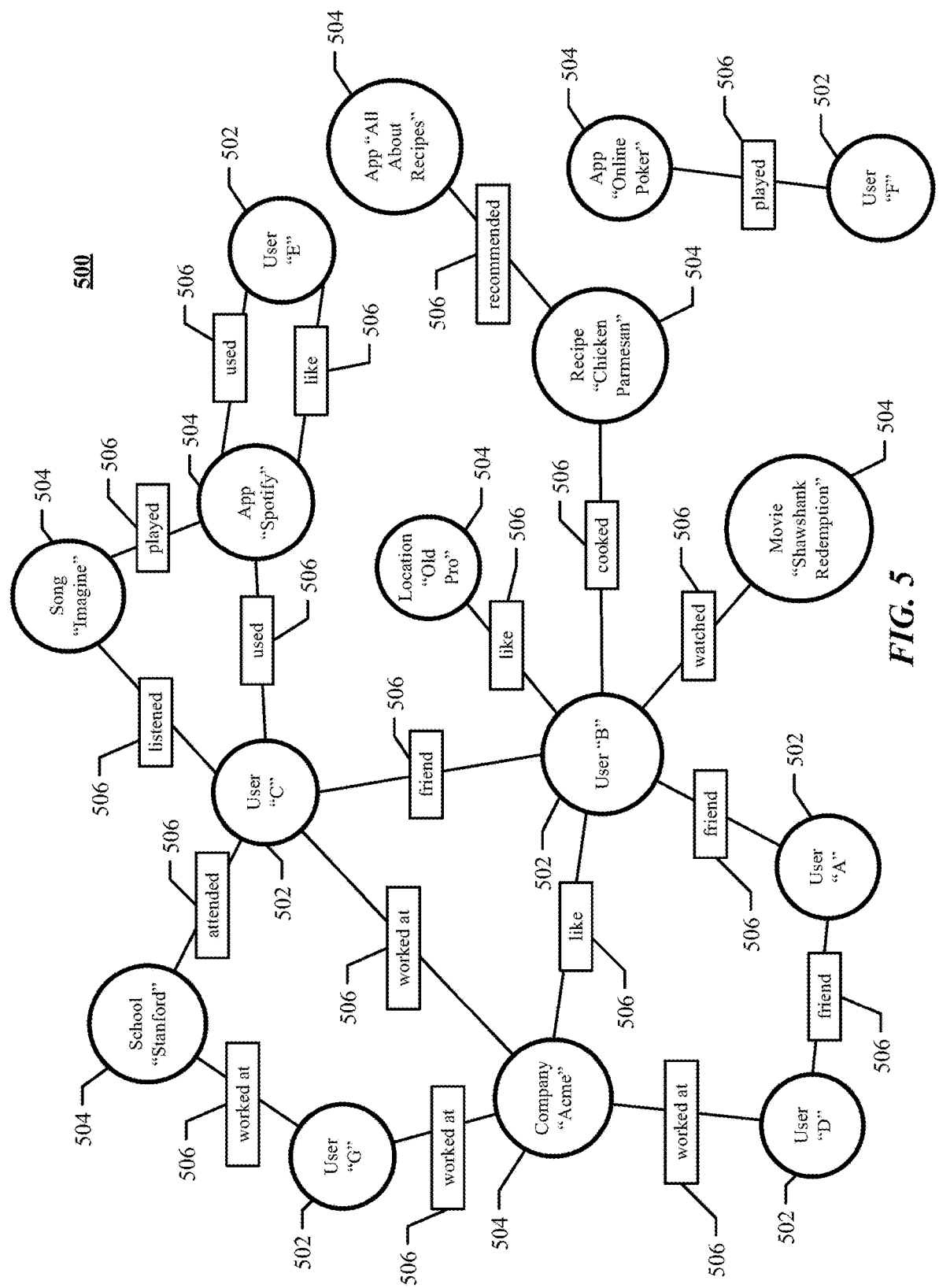
FIG. 5 illustrates example social graph.

FIG. 5 illustrates example social graph 500. In particular embodiments, social-networking system 160 may store one or more social graphs 500 in one or more data stores. In particular embodiments, social graph 500 may include multiple nodes—which may include multiple user nodes 502 or multiple concept nodes 504—and multiple edges 506 connecting the nodes. Each node may be associated with a unique entity (i.e., user or concept), each of which may have a unique identifier (ID), such as a unique number or username. Example social graph 500 illustrated in FIG. 5 is shown, for didactic purposes, in a two-dimensional visual map representation. In particular embodiments, a social-networking system 160, client system 130, or third-party system 170 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 160. In particular embodiments, a user node 502 may be associated with information provided by a user or information gathered by various systems, including social-networking system 160. As an example and not by way of limitation, a user may provide his or her name, profile picture, and contact information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 506 connecting the first user's user node 502 to the second user's user node 502 in social graph 500 and store edge 506 as social-graph information in one or more of data stores 164. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506. The degree of separation between two objects represented by two nodes, respectively, is a count of edges in a shortest path connecting the two nodes in the social graph 500. As an example and not by way of limitation, in the social graph 500, the user node 502 of user "C" is connected to the user node 502 of user "A" via multiple paths including, for example, a first path directly passing through the user node 502 of user "B," a second path passing through the concept node 504 of company "Acme" and the user node 502 of user "D," and a third path passing through the user nodes 502 and concept nodes 504 representing school "Stanford," user "G," company "Acme," and user "D." User "C" and user "A" have a degree of separation of two because the shortest path connecting their corresponding nodes (i.e., the first path) includes two edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 160 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 160 may create an edge 506 between a user node 502 and a concept node 504 in social graph 500. As an example and not by way of limitation, a user viewing a concept-profile page (such as, for example, by using a web browser or a special-purpose application hosted by the user's client system 130) may indicate that he or she likes the concept represented by the concept node 504 by clicking or selecting a "Like" icon, which may cause the user's client system 130 to send to social-networking system 160 a message indicating the user's liking of the concept associated with the concept-profile page. In response to the message, social-networking system 160 may create an edge 506 between user node 502 associated with the user and concept node 504, as illustrated by "like" edge 506 between the user and concept node 504. In particular embodiments, social-networking system 160 may store an edge 506 in one or more data stores. In particular embodiments, an edge 506 may be automatically formed by social-networking system 160 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 504 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 200. A privacy setting may be specified for one or more edges 206 or edge-types of the social graph 200, or with respect to one or more nodes 202, 204 or node-types of the social graph 200. The privacy settings applied to a particular edge 206 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 204 connected to a user node 202 of the first user by an edge 206. The first user may specify privacy settings that apply to a particular edge 206 connecting to the concept node 204 of the object, or may specify privacy settings that apply to all edges 206 connecting to the concept node 204. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 may access such information in order to provide a particular function or service to the first user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160.

In particular embodiments, a user may specify whether particular types of objects or information associated with the first user may be accessed, stored, or used by the social-networking system 160. As an example and not by way of limitation, the first user may specify that images sent by the first user through the social-networking system 160 may not be stored by the social-networking system 160. As another example and not by way of limitation, a first user may specify that messages sent from the first user to a particular second user may not be stored by the social-networking system 160. As yet another example and not by way of limitation, a first user may specify that all objects sent via a particular application may be saved by the social-networking system 160.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the first user may be prompted to specify a particular privacy setting for each context. As an example and not by way of limitation, the first user may utilize a location-services feature of the social-networking system 160 to provide recommendations for restaurants or other places in proximity to the user. The first user's default privacy settings may specify that the social-networking system 160 may use location information provided from a client device 130 of the first user to provide the location-based services, but that the social-networking system 160 may not store the location information of the first user or provide it to any third-party system 170. The first user may then update the privacy settings to allow location information to be used by a third-party image-sharing application in order to geo-tag photos.

In particular embodiments, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The social-networking system 160 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular embodiments, the social-networking system 160 may use a user's previous activities and calculated moods, emotions, or sentiments to determine a present mood, emotion, or sentiment. A user who wishes to enable this functionality may indicate in their privacy settings that they opt in to the social-networking system 160 receiving the inputs necessary to determine the mood, emotion, or sentiment. As an example and not by way of limitation, the social-networking system 160 may determine that a default privacy setting is to not receive any information necessary for determining mood, emotion, or sentiment until there is an express indication from a user that the social-networking system 160 may do so. By contrast, if a user does not opt in to the social-networking system 160 receiving these inputs (or affirmatively opts out of the social-networking system 160 receiving these inputs), the social-networking system 160 may be prevented from receiving, collecting, logging, or storing these inputs or any information associated with these inputs. In particular embodiments, the social-networking system 160 may use the predicted mood, emotion, or sentiment to provide recommendations or advertisements to the user. In particular embodiments, if a user desires to make use of this function for specific purposes or applications, additional privacy settings may be specified by the user to opt in to using the mood, emotion, or sentiment information for the specific purposes or applications. As an example and not by way of limitation, the social-networking system 160 may use the user's mood, emotion, or sentiment to provide newsfeed items, pages, friends, or advertisements to a user. The user may specify in their privacy settings that the social-networking system 160 may determine the user's mood, emotion, or sentiment. The user may then be asked to provide additional privacy settings to indicate the purposes for which the user's mood, emotion, or sentiment may be used. The user may indicate that the social-networking system 160 may use his or her mood, emotion, or sentiment to provide newsfeed content and recommend pages, but not for recommending friends or advertisements. The social-networking system 160 may then only provide newsfeed content or pages based on user mood, emotion, or sentiment, and may not use that information for any other purpose, even if not expressly prohibited by the privacy settings.

In particular embodiments, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular embodiments, for particular objects or information having privacy settings specifying that they are ephemeral, the social-networking system 160 may be restricted in its access, storage, or use of the objects or information. The social-networking system 160 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the social-networking system 160 may temporarily store the message in a data store 164 until the second user has viewed or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

Figure 6:
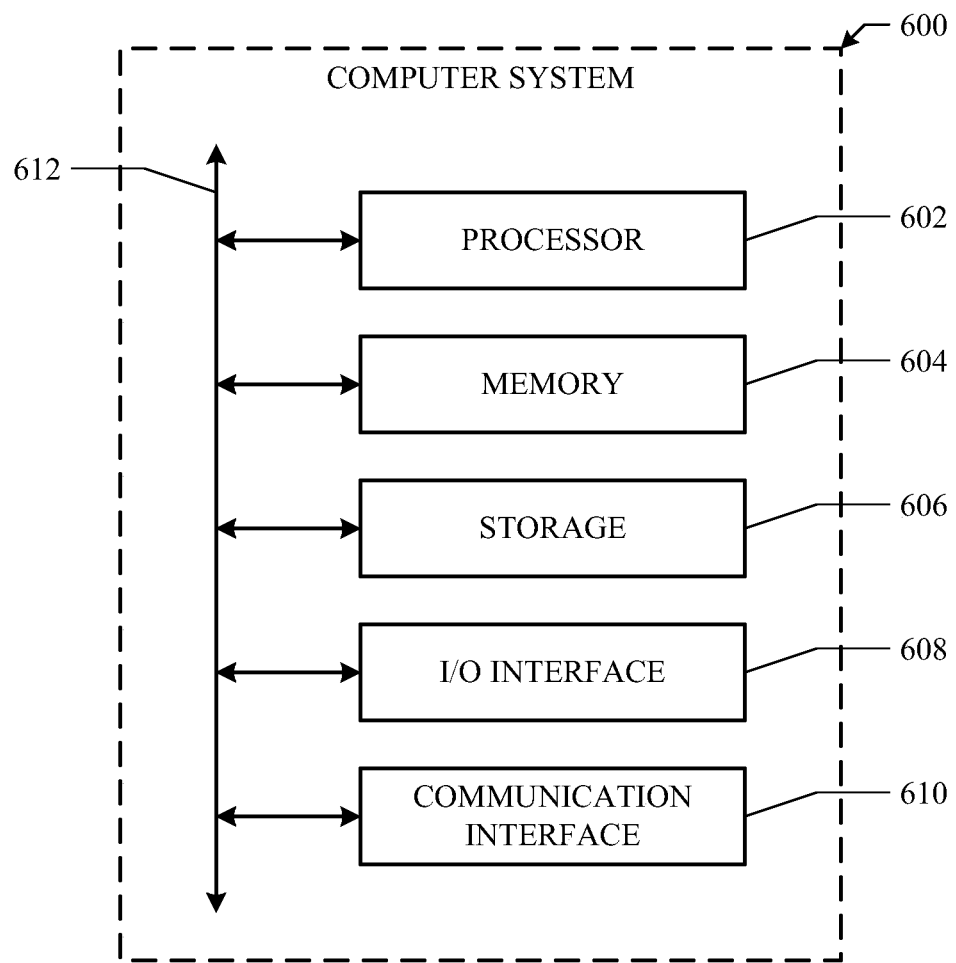
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
by one or more computing systems, detecting an identifier associated with a product;
by the one or more computing systems, determining a third-party system associated with the product based on the identifier;
by the one or more computing systems, accessing a content object of a plurality of content objects associated with the identifier from the third-party system, wherein the content object comprises a set of instructions having a plurality of steps, wherein the content object is selected based on the set of instructions and further based on user preferences of a user associated with the product;
by the one or more computing systems, detecting a trigger;
by the one or more computing systems, selecting a step from the plurality of steps of the set of instructions of the content object; and
by the one or more computing systems, outputting the selected step.

2. The method of claim 1, further comprising monitoring a system environment to detect the product entering the system environment, wherein the identifier is disposed on the product.

3. The method of claim 1, wherein the identifier comprises one or more of a bar code, a quick-response (QR) code, a number, a symbol, and a set of alphanumerical characters.

4. The method of claim 1, further comprising:
determining a privacy setting associated with a user; and
based on the privacy setting, restricting a view area of an image capture device.

5. The method of claim 2, further comprising:
detecting the user associated with the product;
identifying the user as a user of a social-networking system; and
determining one or more user preferences of the user associated with the product based on a user profile associated with the user and stored in the social-networking system.

6. The method of claim 2, further comprising performing a validation check, wherein performing a validation check comprises:
obtaining image data of one or more items of a product;
obtaining a list of items from the content object associated with the product; and
comparing the one or more items from the image data to the list of items from the content object.

7. The method of claim 1, wherein the trigger comprises one or more of a gesture, a sound, a time interval, a contact event, crossing a proximity threshold, and a context.

8. The method of claim 1, further comprising:
detecting a second trigger;
selecting a next step from the plurality of steps of the set of instructions of the content object; and
outputting the next step.

9. The method of claim 8, wherein selecting the next step comprises:
determining one or more steps of the plurality of steps that are completed;
determining one or more steps of the plurality of steps that are not completed;
evaluating a progress of the user in completing a current step; and
selecting the next step based on the one or more completed steps, the one or more not completed steps, and the progress of the user in completing the current step.

10. The method of claim 8, wherein selecting the next step further comprises:
identifying a second step from the plurality of steps of the set of instructions of the content object that was skipped; and
selecting the second step as the next step.

11. The method of claim 1, further comprising:
monitoring a progress of the user as the user completes the selected step;
determining that the user is making an error; and
outputting a warning notification to the user.

12. The method of claim 11, further comprising:
generating additional instructions to mitigate the error; and
outputting the additional instructions to the user.

13. The method of claim 1, wherein at least one alternative content object is associated with the identifier, wherein the at least one alternative content object is one of a simplified content object, a detailed content object, and a variant content object.

14. The method of claim 2, further comprising:
detecting a category associated with the product, wherein the category is a general classification of the product;
identifying the third-party system based on the category;
determining that the third-party system does not store content objects associated with the identifier;
selecting a second identifier associated with the category that is different from the identifier; and
accessing one or more content objects associated with the second identifier.

15. The method of claim 1, further comprising:
selecting a branded effect corresponding to the selected step; and
outputting the branded effect in conjunction the selected step.

16. The method of claim 12, further comprising:
identifying a variant content object of the plurality of content objects associated with the identifier;
matching the error to a step of the variant content object; and
prompting the user to complete the variant content object.

17. The method of claim 1, further comprising:
presenting the plurality of content objects associated with the identifier;
receiving user selection of a first content object; and
selecting a step from the first content object for output to the user.

18. One or more non-transitory computer-readable storage media embodying software that is operable when executed by a server computing system to:
detect an identifier associated with a product;
determine a third-party system associated with the product based on the identifier;
access a content object of a plurality of content objects associated with the identifier from the third-party system, wherein the content object comprises a set of instructions having a plurality of steps, wherein the content object is selected based on the set of instructions and further based on user preferences of a user associated with the product;
detect a trigger;
select a step from the plurality of steps of the set of instructions of the content object; and
output the selected step.

19. A system comprising:
a client system of a user;
one or more processors; and
a memory coupled to the processors comprising instructions executable by the processors, the processors being operable when executing the instructions to:
detect an identifier associated with a product;
determine a third-party system associated with the product based on the identifier;
access a content object of a plurality of content objects associated with the identifier from the third-party system, wherein the content object comprises a set of instructions having a plurality of steps, wherein the content object is selected based on the set of instructions and further based on user preferences of a user associated with the product;
detect a trigger;
select a step from the plurality of steps of the set of instructions of the content object; and
output the selected step.

20. The method of claim 5, wherein the one or more user preferences of the user associated with the product are provided by the user prior to detecting the identifier associated with the product, based on a received user selection, or determined from a user activity history associated with the user.

* * * * *